(12) United States Patent
Bushnell (10) Patent No.: US 10,395,537 B2
(45) Date of Patent: Aug. 27, 2019

(54) VIRTUAL MIRROR TECHNIQUE FOR MEASURING TIME AND FREQUENCY OFFSETS BETWEEN CLOCKS ON MOVING PLATFORMS

(71) Applicant: THE BOEING COMPANY, Chicago, IL (US)

(72) Inventor: Glenn S. Bushnell, Puyallup, WA (US)

(73) Assignee: THE BOEING COMPANY, Chicago, IL (US)

(*) Notice: Subject to any disclaimer, the term of this patent is extended or adjusted under 35 U.S.C. 154(b) by 109 days.

(21) Appl. No.: 15/706,503

(22) Filed: Sep. 15, 2017

(65) Prior Publication Data
US 2019/0088131 A1 Mar. 21, 2019

(51) Int. Cl.
| | |
|---|---|
| G08G 1/16 | (2006.01) |
| G08G 5/00 | (2006.01) |
| G01S 13/93 | (2006.01) |
| G05D 1/10 | (2006.01) |
| G01S 17/74 | (2006.01) |
| G01S 17/88 | (2006.01) |

(Continued)

(52) U.S. Cl.
CPC .............. G08G 1/161 (2013.01); G01S 11/12 (2013.01); G01S 13/9303 (2013.01); G04G 7/00 (2013.01); G05D 1/104 (2013.01); G08G 5/0008 (2013.01); *G01S 17/74* (2013.01); *G01S 17/88* (2013.01)

(58) Field of Classification Search
None
See application file for complete search history.

(56) References Cited

U.S. PATENT DOCUMENTS

| | | | | |
|---|---|---|---|---|
| 7,855,682 | B2* | 12/2010 | Gould ..................... | G01S 5/021 342/387 |
| 8,493,123 | B2* | 7/2013 | Wilkinson ............... | G04G 7/00 327/141 |

(Continued)

FOREIGN PATENT DOCUMENTS

EP  2799943 A2  11/2014

OTHER PUBLICATIONS

European Search Report for Application No. 18163875.0-1219 dated Oct. 24, 2018.

(Continued)

*Primary Examiner* — Todd M Melton
(74) *Attorney, Agent, or Firm* — Patterson + Sheridan, LLP (57) ABSTRACT

Aspects herein describe techniques for synchronizing clocks between two moving platforms using optical signals generated from lasers to measure clock offsets and determine a separation distance between moving platforms. Once the clocks are synchronized (e.g., an offset between the clocks is determined), the moving platforms can share sensor data, location data, and other information which is dependent on accurate timestamps and relative positions. In one aspect, one of the platforms serves as a virtual mirror. That is, the platform transmits a pulse at the same instance a pulse is received, similar to a mirror that reflects incident light. For example, the first platform may transmit pulses which are received at the second platform. The second platform can use optical or electrical components to form the virtual mirror that transmits an optical pulse to the first platform each time a pulse is received at the second platform.

20 Claims, 5 Drawing Sheets

(51) Int. Cl.
*G04G 7/00* (2006.01)
*G01S 11/12* (2006.01)

(56) References Cited

U.S. PATENT DOCUMENTS 9,739,876 B2 8/2017 Bushnell et al.
2016/0299221 A1 10/2016 Bushnell et al.

OTHER PUBLICATIONS

Bergeron Hugo et al: 11 Doppler-tolerant synchronization of clocks over free space at the femtosecond level 11 2017 Joint Conference of the European Frequency and Time Forum and IEEE International Frequency Control Symposium (EFTF/IFC), IEEE, Jul. 9, 2017 (Jul. 9, 2017), pp. 130-131, XP033241860, DOI: 10.1109/FCS.2017.8088823.
David W Allan et al: 11 Shuttle Experiment to Demonstrate High-Accuracy Global Time and Frequency Transfer 11 IEEE Transactions on Geoscience and Remote Sensing, IEEE Service Center, Piscataway, NJ, US, vol. 45, No. 3, Jul. 1, 1982 (Jul. 1, 1982), pp. 321-325, XP011177824, ISSN: 0196-2892.
Moreira et al., "Digital Dual Mixer Time Difference for Sub-Nanosecond Time Synchronization in Ethernet," 2010 IEEE International, Frequency Control Symposium Year: 2010 pp. 449-453.
U.S. Appl. No. 15/582,555 entitled, "Precision Relative Positioning and Free Space Time Transfer Between Moving Platforms", filed Apr. 28, 2017 (US 2018-0317184 A1).

* cited by examiner

VIRTUAL MIRROR TECHNIQUE FOR MEASURING TIME AND FREQUENCY OFFSETS BETWEEN CLOCKS ON MOVING PLATFORMS

BACKGROUND

This disclosure relates to relative timing and positioning measurements.

Relative positioning determines a location of a moving platform relative to one or more other platforms. Examples of moving platforms include land vehicles, ships, spacecraft, and aircraft. In some aspects, a position of a moving platform, such as an aircraft in flight, is determined relative to a non-moving platform, such as a stationary vehicle. In some instances, each of the platforms is a moving platform (e.g., two moving aircrafts or an aircraft and a ship or land vehicle).

Signals sent from respective platforms can be received and processed to determine distances between the platforms. Some techniques for determining relative positions of two or more platforms incorporate time transfer techniques, including two-way time transfer (TWTT). For example, a clock associated with each platform can record a time at which the platform sent a signal to another platform and a time at which the platform received a signal from other platform. The recorded time data can be used to calculate an offset or deviation between the clocks and to determine distances between the respective platforms and to prevent platform positioning errors due to time differences between the clocks of the respective platforms since each aircraft has two equations with two unknowns (i.e., the clock offset and the relative distance). In examples where the respective platforms are both moving, determining the relative positioning between the platforms involves consideration of parameters such as changing distances due to each platform being in motion. If these parameters are not considered, the clocks in the moving platforms may not be synchronized which can prevent the platforms from sharing data that is dependent on accurate timestamps and relative positions.

SUMMARY

One aspect of the present invention is a method that includes receiving a first optical signal transmitted by a first moving platform where the first optical signal includes a first plurality of pulses and adjusting a command signal at a second moving platform such that the received first plurality of pulses overlap a second plurality of pulses generated at the second moving platform. The method also includes transmitting a second optical signal comprises the second plurality of pulses from the second moving platform to the first moving platform where each of the second plurality of pulses is transmitted from the second moving platform at the same time each of the first plurality of pulses is received at the second moving platform and determining a first time offset between a first clock in the first moving platform and a second clock in the second moving platform based on the second plurality of pulses received at the first moving platform.

Another aspect of the present invention is a platform that includes an optical receiver configured to receive a first optical signal transmitted by a different platform through free space where the first optical signal includes a first plurality of pulses and circuitry forming a virtual mirror. The circuitry includes a PRF regulator configured to adjust a command signal such that the received first plurality of pulses overlap a second plurality of pulses and a pulsed laser source configured to transmit a second optical signal that includes the second plurality of pulses to the different platform where each of the second plurality of pulses is transmitted from the second moving platform at the same time each of the first plurality of pulses is received at the second moving platform.

Another aspect of the present invention is a method that includes transmitting a first plurality of optical pulses from a first moving platform to a second platform where the second platform is configured as a virtual mirror to transmit a second plurality of pulses to the first moving platform and where each of the second plurality of pulses is transmitted from the second platform at the same time each of the first plurality of pulses is received at the second platform. The method includes determining a first time offset between a first clock in the first moving platform and a second clock in the second platform based on the second plurality of pulses received at the first moving platform.

BRIEF DESCRIPTION OF ILLUSTRATIONS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects herein describe techniques for synchronizing clocks between two moving platforms (e.g., land vehicles, ships, aircraft, spacecraft, satellites, and the like). While global positioning system (GPS) satellite signals can be used to synchronize the clocks, GPS signals can be jammed, and even when available, the accuracy of these signals is not sufficient for some applications. Instead, aspects herein describe using optical signals (e.g., wireless signals) generated from lasers to measure clock offsets between moving platforms. Once the clocks are synchronized (e.g., an offset between the clocks is determined), the moving platforms can share sensor data, location data, and other information which is dependent on accurate timestamps and relative positions (e.g., range plus azimuth/elevation (AZ/EL) from arrival angles). In one aspect, optical signals can be used to synchronize clocks with an accuracy of less than 10 picoseconds.

Time transfer and relative positioning techniques can involve optical sampling of signals from, for example, a first platform and a second platform. A pulse repetition frequency, or a number of pulses of a repeating signal in a specific time unit (e.g., pulses per second), of a signal can be modified in view of a pulse repetition frequency of another signal. In one aspect, one of the platforms serves as a virtual mirror. That is, the platform transmits a pulse at the same instance a pulse is received, similar to a mirror that reflects incident light. For example, the first platform may transmit pulses that are received at the second platform which serves as a virtual mirror. The second platform can use optical or electrical components to form the virtual mirror so that a pulse is transmitted from the second platform to the first platform each time a pulse is received.

Example methods and apparatus disclosed herein use lasers to measure relative distance between moving platforms and to synchronize clocks in the moving platforms by changing laser pulse repetition frequency and controlling the pulse repetition frequency of pulses emitted by the lasers over long distances during, for example, aircraft flight. Femtosecond pulsed lasers can be used to command or set the pulse repetition frequency of the emitted pulses. Alternatively, the platforms may include respective continuous wave laser and modulators for setting the pulse repetition frequency of emitted pulses.

Figure 1:
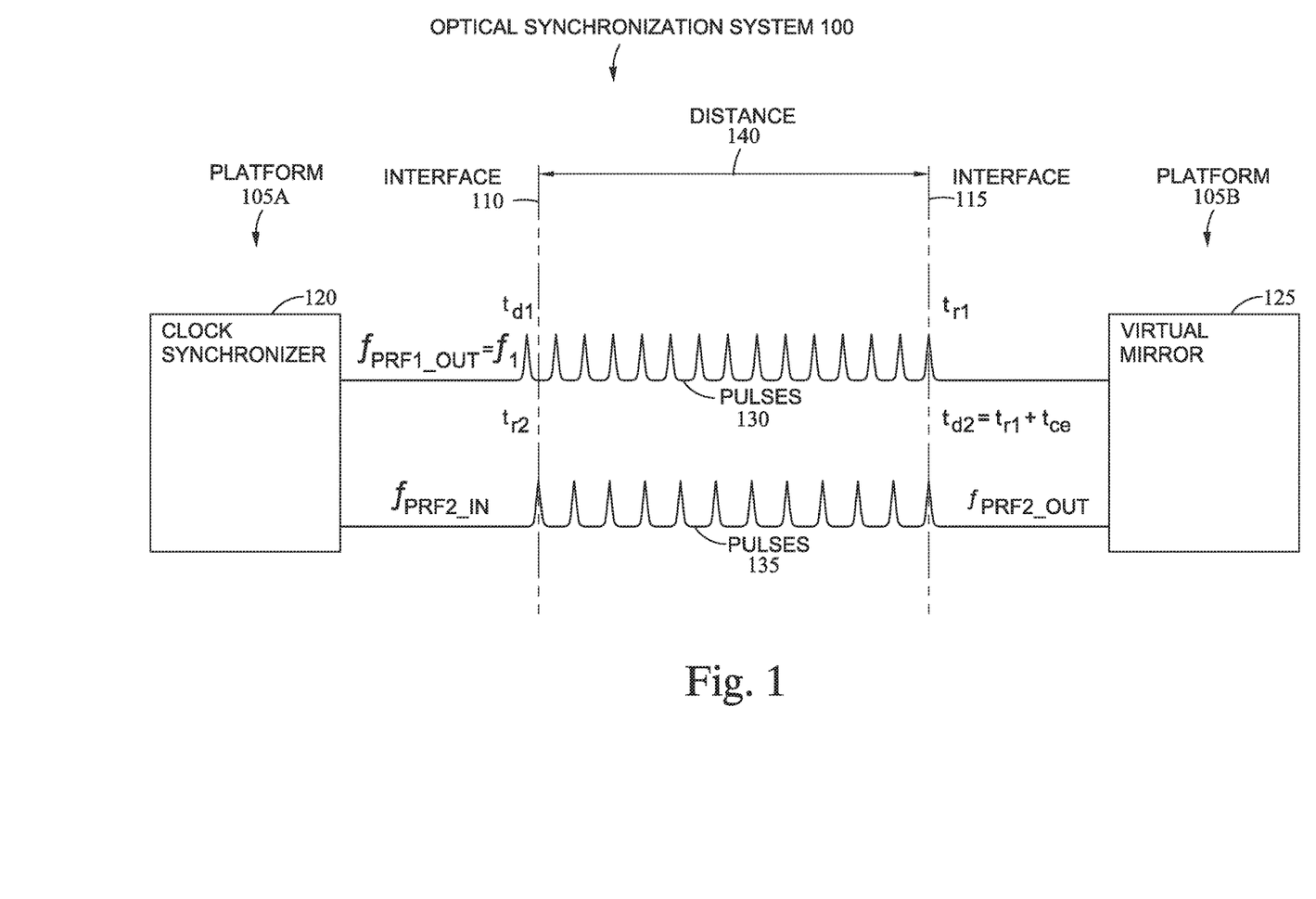
FIG. 1 illustrates using a virtual mirror when communicating optical pulses between two moving platforms.

FIG. 1 illustrates an optical synchronization system 100 that includes a virtual mirror 125 for communicating optical pulses between two moving platforms. The system 100 includes a first platform 105A and a second platform 105B. The first platform 105A includes a clock synchronizer 120 that includes components for outputting a plurality of optical pulses 130 (e.g., a optical pulse train). For example, the clock synchronizer 120 may include an optical source such as a femtosecond laser or continuous wave laser which is modulated to output the pulses 130 at an interface 110 with a set pulse repetition frequency (PRF) ($f_1$ or $f_{PRF1\_OUT}$). In one aspect, the clock synchronizer 120 captures or stores the times ($t_{d1}$) at which the pulses 130 are transmitted at the interface 110.

The pulses 130 travel across a distance 140 (e.g., free space) until reaching an interface 115 of the second platform 105B. In one aspect, the interfaces 110 and 115 may be respective outer skins or surfaces of the platforms 105. In one aspect, the interfaces 110 and 115 may include optical detectors that are disposed at the external surface of the platforms 105 or an optical lens (e.g., a collimator) can transfer the light from the external surface to an optical detector within the platforms 105.

The second platform 105B includes the virtual mirror 125 which includes components for detecting the received optical pulses 130, updating a PRF in response to the received pulses 130, and transmitting a plurality of optical pulses 135 in response to receiving the optical pulses 130 (e.g., an optical train pulse) back towards the first moving platform 105A. That is, the virtual mirror 125 behaves similar to an actual mirror such that each time one of the pulses 130 is received at the interface 115, a corresponding one of the pulses 135 is transmitted from the second platform 105B, much like how an actual mirror would reflect incident pulses. However, one advantage of using the virtual mirror 125 rather than an actual mirror is the power in the pulses 135 can be controlled. That is, because the virtual mirror 125 includes an optical source for generating the pulses 135 (rather than just reflecting the pulses 130 like an actual mirror), the virtual mirror 125 can control the optical power of the pulses 135 which can make the optical synchronization system 100 feasible for much larger distance 140 than if an actual mirror were used.

In one aspect, the virtual mirror 125 measures the time ($t_{r1}$) when the pulses 130 reach the interface 115 as well as the time ($t_{d2}$) at which a corresponding one of the pulses 135 is transmitted. The time $t_{r1}$ may be the same as the time $t_{d2}$ except for a small command error ($t_{ce}$) resulting from the dynamic response of the PRF regulator or unpredictable component delays. Predictable delays in the optical or electrical components can be accounted for in the virtual mirror 125. As shown, the pulses 135 travel across the distance 140 to the interface 110 of the first platform 105A where the pulses 135 are received by the clock synchronizer 120.

The virtual mirror 125 outputs the pulses 135 at a PRF $f_{PRF2\_OUT}$ which is related to the PRF $f_1$ of the pulses 130 as shown by Equation 1:

$$f_{PRF2\_OUT} = f_1 - f_o + f_c \qquad (1)$$

In Equation 1, the frequency $f_o$ is an instantaneous estimated frequency offset (which is the difference between the platform clock frequencies $f_1$ and $f_2$) and the frequency $f_c$ is a delta PRF command used by the virtual mirror 125 to control a PRF regulator in order output one of the pulses 135 each time one of the pulses 130 is received. The frequency $f_c$ is affected by the Doppler shift. Thus, Equation 1 illustrates that the frequency $f_1$ at which the first platform 105A emits the pulses 130 may be different than the frequency $f_{PRF2\_OUT}$ at which the second platform 105B emits the pulses 135.

The clock synchronizer 120 measures and stores the time ($t_{r2}$) at which the pulses 135 are received at the interface 110. In one aspect, the clock synchronizer 120 determines the Doppler shift by comparing the frequencies at which the pulses 130 are transmitted and the pulses 135 are received—i.e., $f_{PRF1\_OUT}$ (or $f_1$) and $f_{PRF2\_OUT}$. Moreover, the second platform 105B may transmit the delta pulse PRF command frequency ($f_c$) wirelessly to the first platform 105A. With this information, the clock synchronizer 120 can identify the instantaneous estimated frequency offset $f_o$ and a time offset between the internal clock in the first platform 105A and the internal clock in the second platform 105B. Using the time offset, the first platform 105A can synchronize timestamps generated using its clock with the clock in the second platform 105B. Once synchronized, the moving platforms 105 can share sensor data, location data, and other information which is dependent on accurate timestamps and relative positions.

In one aspect, both moving platforms 105 can serve as a virtual mirror. For example, at a different time period, the second platform 105B transmits an optical pulse train to the first platform 105A which is received by a virtual mirror in the first platform 105A. This virtual mirror generates a corresponding optical pulse train that is transmitted back to the second platform 105A as described above. Although the first and second platforms 105 can switch between which of the platforms 105 serves as the virtual mirror, in one aspect, both platforms can serve as virtual mirrors in parallel. In this example, the platforms 105 may use optical signals with different wavelengths so the communication can occur simultaneously and the optical signals can be distinguished from each other. For example, the pulses 130 and 135 transmitted by the first platform 105A and the virtual mirror 125 of the second platform 105B may have a different wavelength than the pulses transmitted by the second platform 105B and a virtual mirror on the first platform 105A.

Figure 2:
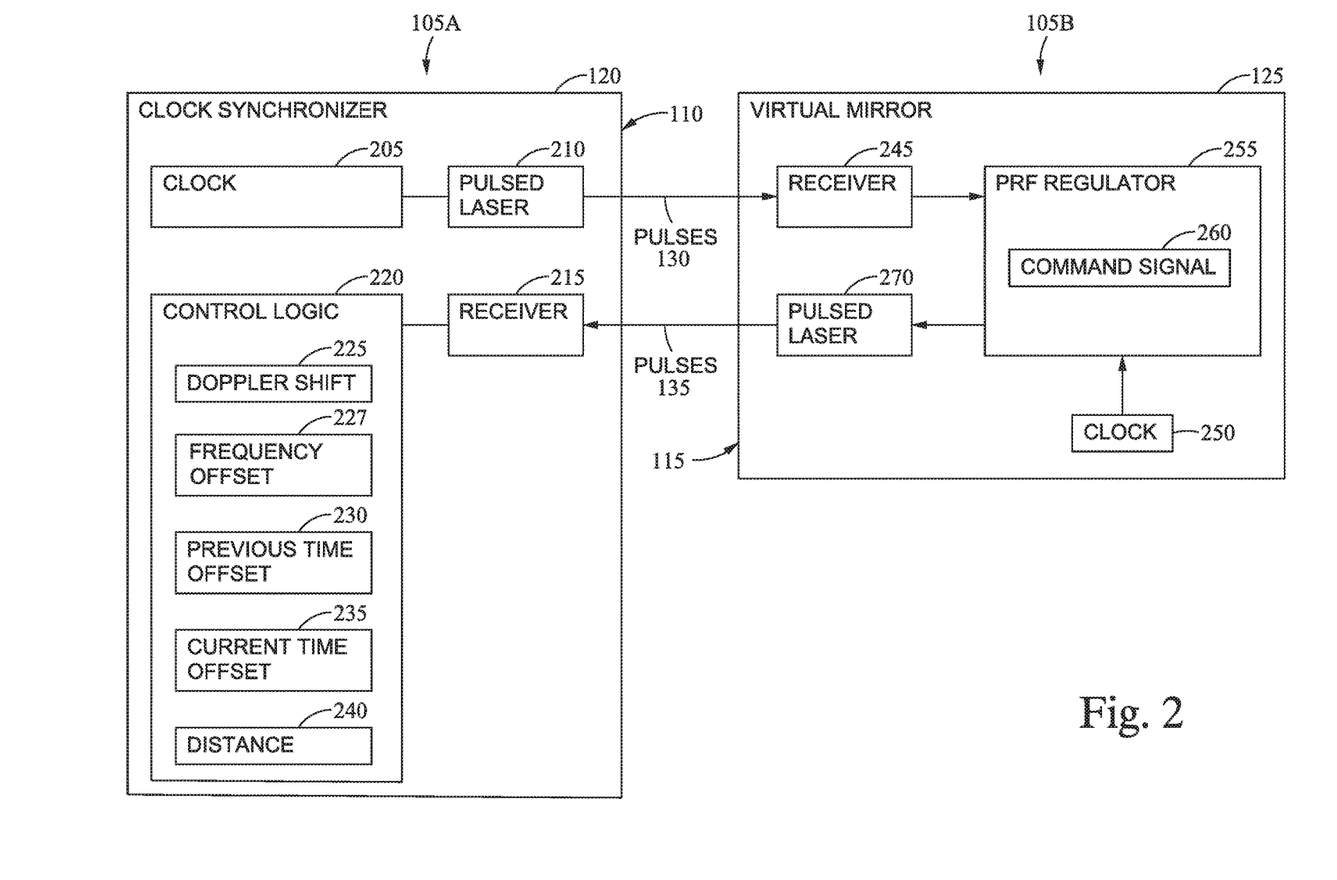
FIG. 2 is system for synchronizing clocks in two moving platforms using a virtual mirror.

FIG. 2 is a system for synchronizing clocks in two moving platforms using the virtual mirror 125. The system in FIG. 2 includes the first platform 105A and the second platform 105B. The clock synchronizer 120 includes a clock 205, a pulsed laser 210, a receiver 215, and control logic 220. The clock 205 may include a crystal oscillator for generating a clock signal that is used by the pulsed laser 210 to output the pulses 130 at a defined PRF $f_1$. In one aspect, the pulsed laser 210 is a femtosecond laser which outputs the pulses 130 at the frequency $f_1$. In another aspect, the pulsed laser 210 includes a continuous wave (CW) laser source and a modulator which modulates a CW optical signal to form the pulses 130 at the frequency $f_1$.

The virtual mirror 125 in the second platform 105B also includes an internal clock 250 which can include an oscillator. In one aspect, when starting a mission, the clocks 205 and 250 may be synchronized. However, over time, due to the imperfect nature of the oscillators, the clocks 205 and 250 can drift apart. This time difference between the clock 205 and the clock 250 is referred to herein as the time offset.

In addition to the clock 250, the virtual mirror 125 includes a receiver 245, a PRF regulator 255 and a pulsed laser 270. The receiver 245 may include an optical detector which receives the pulses 130. In one aspect, the PRF regulator 255 overlaps the received pulses 130 with pulses generated by the clock 250 using heterodyning. Heterodyning, or mixing the frequencies of the first signal and the second signal, provides for a time-based comparison of the pulses of the first signal and the second signal. The overlapped pulses with their associated pulse repetition frequencies can be locked by heterodyning a local signal, or pulse train, with a pulse train received from another platform to combine and mix the pulse frequencies. Aligning the pulses enables optical sensing of time phase differences between the pulse trains. The PRF regulator 255 can issue commands (e.g., command signal 260) or corrections that result in adjustments to the bias or offset of the received pulses 130 to the pulses generated using the clock 250.

After adjusting the pulse repetition frequency of the pulses generated by the clock 250 such that these pulses overlap the received pulses 130, the pulse trains are optically combined, or heterodyned, at the second platform 105B. Optically combining the pulse trains locks the pulses generated using the clock 250 to the pulses 130. Although optical heterodyning in an optical domain is disclosed, the aspects described herein are not limited to such. For example, in another aspect, the optical pulses 130 may be converted into electrical signals which are then mixed using heterodyning to lock the pulse trains in an electrical domain. In another example, second harmonic generation can be used where photons of the respective pulse trains interact with a non-linear crystal which results in combining two photons from the pulse trains and emitting a single photon with twice the energy in the output beam.

The PRF regulator 255 controls the pulsed laser 270 which generates the pulses 135. Because the received pulses 130 overlap the pulses generated using the clock 250, the pulsed laser 270 outputs a pulse each time one of the pulses 130 is received, thereby generating a virtual mirror. As mentioned above, the PRF $f_{PRF2\_OUT}$ used to output the pulses 135 may be different than the frequency used by the pulsed laser 210 to output the pulses 130 due to the command signal 260 (which is affected by the Doppler shift) used to overlap the pulses 130 with a pulse train generated by the clock 250 as shown in Equation 1.

The receiver 215 on the first platform 105A receives the pulses 135 which are then evaluated by the control logic 220. In one aspect, the control logic may contain a processor and memory for executing software that processes the received pulses 135 and determines a time offset between the clocks 205 and the clock 250. In another aspect, the control logic 220 may include specialized hardware and firmware for performing these functions.

The control logic 220 can detect the frequency of the pulses 135 received from the virtual mirror 125 and the frequency of the pulses 130 transmitted from the interface 110 to determine a Doppler shift 225 resulting from the platforms 105 moving. Moreover, the second platform 105B can transmit the command signal 260 used to overlap the optical pulses in the PRF regulator 255 to the first platform 105A which the control logic 220 uses to calculate the instantaneous frequency offset $(f_o)$ 227. That is, the frequency offset 227 calculation accounts for the Doppler shift between the two platforms 105 (otherwise the frequency offset 227 is equal to $f_c$ if there is no control error). Using the frequency offset 227 and a previous time offset 230, the control logic 220 can determine a current time offset 235 between the clocks 205 and 250. Moreover, the control logic 220 can calculate a distance 240 between the platforms 105 using the time of travel using the virtual mirror.

As mentioned above, both platforms 105 may be configured to perform a virtual mirror. Thus, all the components in the virtual mirror 125 may also be disposed in the first platform 105A and all the components in the clock synchronizer 120 may also be disposed in the second platform 105B. As such, both platforms can use the virtual mirror 125 to calculate the current time offset 235. In addition to using the virtual mirror 125, the platforms 105 may calculate the current time offset 235 using a two-way time transfer (TWTT) technique. Calculating the current time offset 235 using a virtual mirror and a TWTT technique may provide data redundancy and improve reliability.

Figure 3:
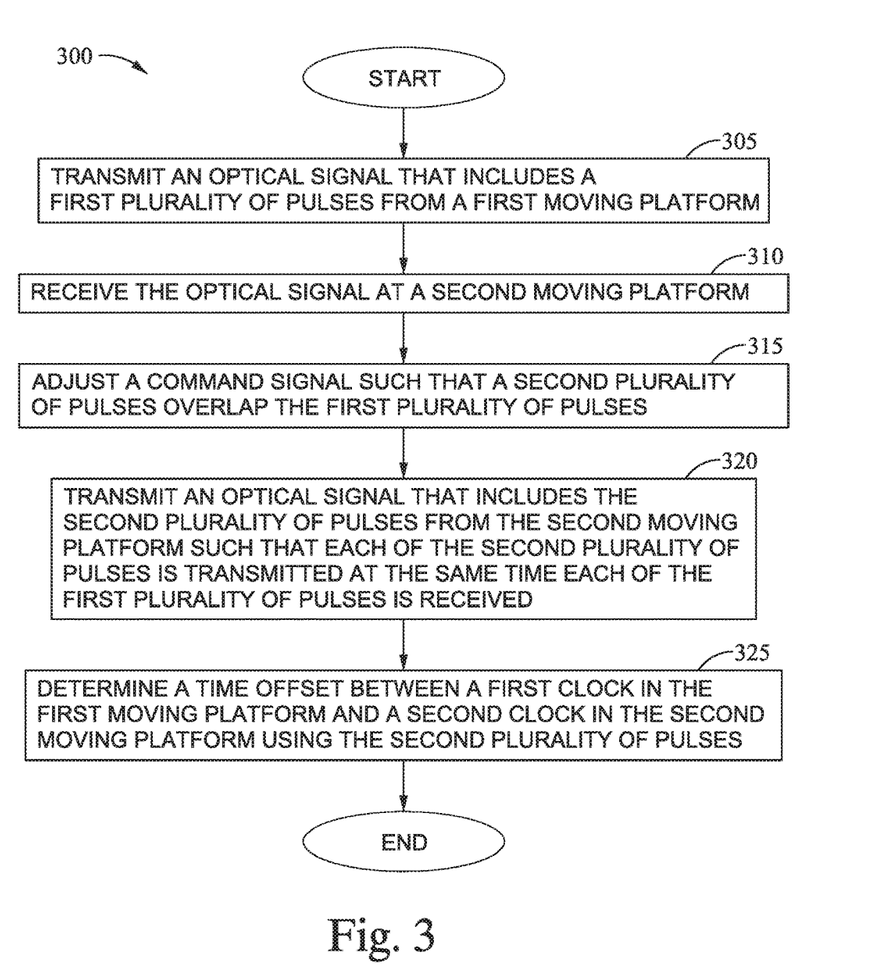
FIG. 3 is a flowchart for determining a time offset between clocks in two moving platforms using a virtual mirror.

FIG. 3 is a flowchart of a method 300 for determining a time offset between clocks in two moving platforms using a virtual mirror. At block 305, a first platform transmits an optical signal that includes a first plurality of optical pulses to a second platform. In one aspect, one or both of the platforms are moving such that the relative distance between the two platforms can change. The pulses can be generated using a femtosecond laser or a CW laser with an optical modulator. Furthermore, the PRF $f_1$ or $f_{PRF1\_OUT}$ at which the pulses are outputted can be controlled by a clock in the first platform as shown in FIG. 2.

At block 310, the second platform receives the optical signals. Due to the Doppler Shift, the frequency at which the pulses were transmitted may not be the same frequency at which the pulses are received at the second platform because of the relative movement between the two platforms.

At block 315, a PRF regulator in the second platform adjusts a command signal such that a second plurality of optical pulses overlap the first plurality of optical pulses. In one aspect, the second plurality of optical pulses are generated using a clock internal to the second platform. Because of the time offset between the clocks (as well as the Doppler shift and other factors), the second plurality of pulses may not initially overlap the first plurality of pulses received from the first platform. As such, the PRF regulator adjusts the command signal until the first and second plurality of optical pulses overlap. Although this can be done using optical signals, this adjustment can also be performed electrically. For example, the first plurality of optical signals can be converted into electrical signals and the phase of the electrical signals can be adjusted using the command signal until the electrical signals have the same phase (e.g., overlap) electrical signals generated using the internal clock on the second platform. The phase-aligned electrical signals can then be used to generate the second plurality of optical signals.

At block 320, the second platform transmits an optical signal that includes the second plurality of optical pulses such that each of the second plurality of optical pulses is transmitted at approximately the same time each (e.g., within a picosecond) of the first plurality of pulses is received. In other words, the second platform includes a virtual mirror that behaves like an actual mirror where a pulse is transmitted at the same time a pulse is received. However, unlike an actual mirror, the second platform can control the optical power of the second plurality of optical pulses so that the range of the communication system can be increased (and stealth maintained by not adding a reflective element).

At block 325, the first platform determines a time offset between a first clock in the first platform and a second clock in the second moving platform using the second plurality of pulses. In one aspect, the first and second platforms also reflect or transmit a code to identify when a specific pulse is sent and received to the other platform. The details for determining the time offset are described in detail in FIG. 4. Once the time offset is identified (i.e., once the first and second clocks are synchronized), the first and second moving platforms can share sensor data, location data, and other information which is dependent on accurate timestamps and relative positions.

Figure 4:
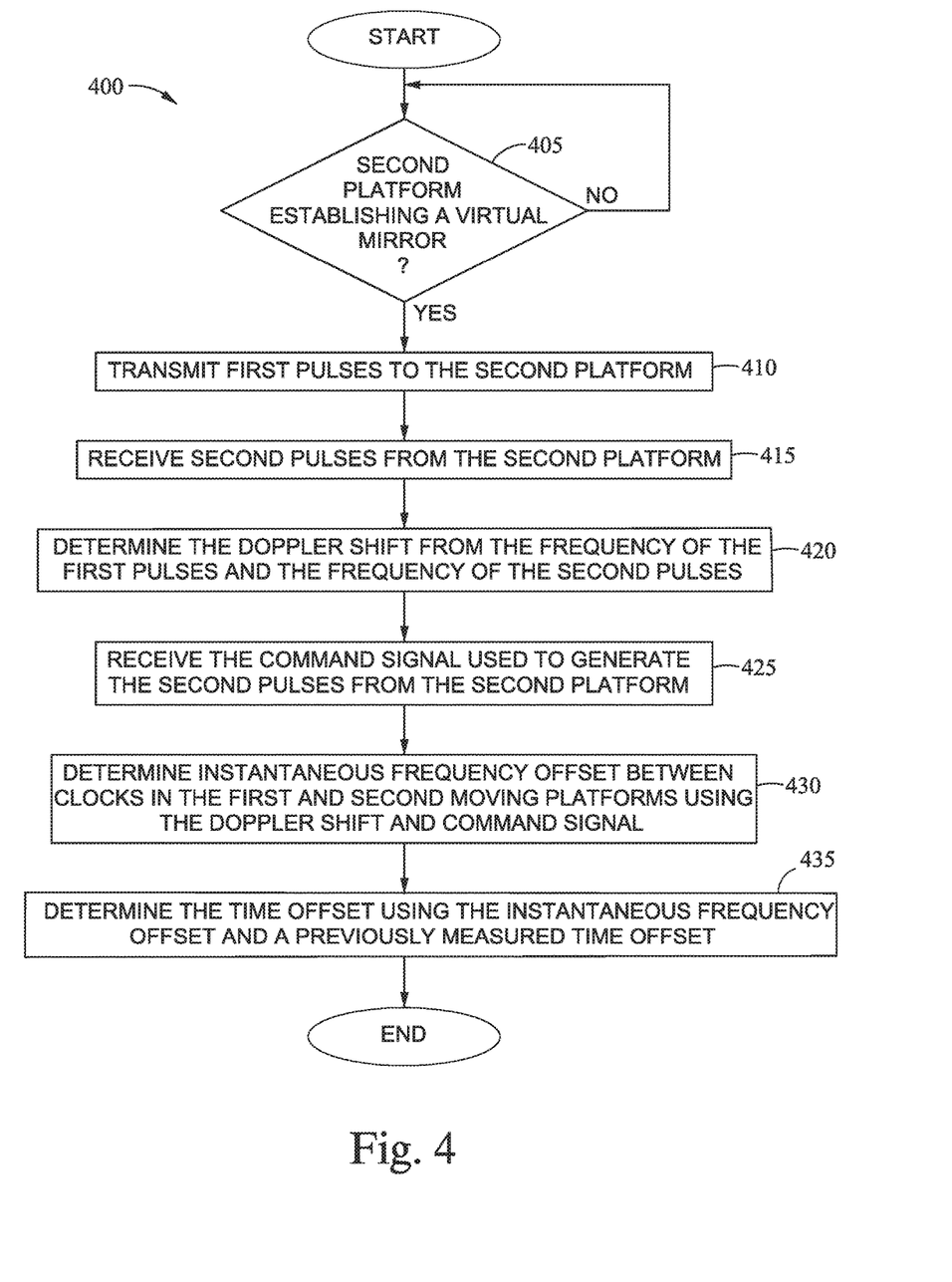
FIG. 4 is a flowchart for determining a time offset between clocks in two moving platforms using a virtual mirror.

FIG. 4 is a flowchart of a method 400 for determining a time offset between clocks in two moving platforms using a virtual mirror. In one aspect, the method 400 is from the perspective of the moving platform that transmits the optical pulse train to a second moving platform serving as the virtual mirror. The method 400 begins at block 405 where the first platform determines whether the second platform establishes a virtual mirror. In one aspect, an optical communication link (which can be established before the virtual mirror is established) can be used to indicate when the virtual mirror is operational. In another aspect, the second platform informs the first platform when the virtual mirror is operational using a different communication means—e.g., RF communication rather than optical communication. In another aspect, the first platform transmits an instruction to the second platform to begin serving as a virtual mirror.

At block 410, the first platform transmits first optical pulses to the second platform. At block 415, the first platform receives second pulses from the second platform. As shown in FIG. 1, the first platform transmits the first pulses at a PRF of $f_1$ or $f_{PRF1\_OUT}$. The first platform also measures the PRF of the second optical pulses which is shown in FIG. 1 as $f_{PRF2\_IN}$.

In one aspect, the blocks 420, 430, and 435 correspond to the block 325 in the method 300. Put differently, the blocks 420, 430, and 435 illustrate one example of calculating the time offset between the first clock in the first platform and the second clock in the second platform using a virtual mirror implemented by the second platform. At block 420, the first platform determines the Doppler shift between the two moving platforms from the frequency of the first optical pulses when transmitted from the first platform ($f_{PRF1\_OUT}$) and the frequency of the second optical pulses when received at the first platform ($f_{PRF2\_IN}$). The Doppler shift can be calculated from Equation 2:

$$\text{Doppler Shift} = \frac{f_{PRF1\_OUT} - f_{PRF2\_IN}}{2} \qquad (2)$$

At block 425, the first platform receives the command signal used by the second platform to generate the second optical pulses. As described above in FIG. 2, the PRF regulator 255 in the second platform adjusts the command signal 260 until the first optical signals received from the first platform overlap optical signals generated using the second clock in the second platform. The command signal can be expressed in a frequency $f_c$.

In one aspect, the second platform transmits the value of the command signal to the first platform using optical communication. For example, using the pulsed laser source in the virtual mirror, the second platform may encode data into the pulses generated by the pulsed laser source (when the virtual mirror is not currently being used to reflect the received pulses) which indicates the value of the command signal. In another aspect, the second platform transmits the value of the command signal using other communication means such as a RF antenna. In this scenario, the second platform can transmit the value of the command signal to the first platform while the virtual mirror is operating (since the RF antenna can be part of a separate communication system in the second platform).

At block 430, the first platform determines the instantaneous frequency offset between clocks in the first and second moving platforms using the Doppler shift and command signal. The frequency offset $f_o$ is expressed in Equation 3:

$$f_o \approx f_c - \frac{f_{ce}}{2} + \text{Doppler Shift} \qquad (3)$$

In Equation 3, the $f_c$ is the frequency of the command signal used to adjust the PRF regulator in the second platform and $f_{ce}$ is the frequency of a PRF command error resulting from delays or inaccuracies when generating the command signal in the second platform. The PRF command error may be predetermined (i.e., already known to the first platform) or transmitted from the second platform to the first platform.

At block 435, the first platform determines the time offset using the frequency offset and a previously measured time offset. In one aspect, the current time offset is an average of time offset ($t_{om}$) which is expressed by Equation 4:

$$t_{om} = t_o + \frac{f_o}{f_1 - f_o}\left(t_{r1} + \frac{t_{ce}}{2}\right) \qquad (4)$$

In Equation 4, the time $t_o$ is the previously measured time offset, time $t_{r1}$ is the time the first optical pulses are received at the second platform (which the second platform can transmit to the first platform), the frequency $f_o$ is the instantaneous frequency offset measured using Equation 3, the frequency $f_1$ is the frequency used to output the first optical pulses, and the time $t_{ce}$ is the difference between the perfect mirror pulse time and the actual time that the pulse is sent. Using Equation 4, the first platform can generate an average current time offset between the clocks in the first and second platforms. In one aspect, Equation 4 assumes a linear offset drift between the clocks.

In another aspect, instead of using Equation 4, the first platform can use the following to calculate the time offset $t_{om}$:

$$t_{om} = \frac{f_o}{f_1}\frac{(t_{r2} + t_{d1})}{2} + \frac{f_1 - f_0}{f_1}t_0 \qquad (5)$$

In Equation 5, the first platform does not need information from the second platform (e.g., does not use time $t_{r1}$) to calculate the time offset $t_{om}$.

When the method 400 first begins, the clocks in the two platforms may have recently been synchronized to the same time (or time and frequency offsets computed at a given reference time, and this can be repeated). Thus, the previous time offset $t_o$ may be assumed to be zero (or the time on Platform B relative to a reference time may be zero, and the time on platform A be the offset time) when the current time offset is first calculated at block 435. In one aspect, the time offset $t_{om}$ in Equations 4 and 5 is the offset when the clock on first platform is equal to the offset time and the clock on the second platform is zero. Zero time can be zero time from a given reference time. The method 400 can repeat at intervals in order to update the current time offset (e.g., a running sum) using the previously measured time offset. In this manner, the first platform can continually update the time offset between the clocks.

In one aspect, the roles are reversed between the two platforms where the second platform transmits the first optical pulses and the first platform functions as the virtual mirror. For example, during a first time period the second platform functions as the virtual mirror so the first platform can calculate the time offset using the method 400 and during a second time period the first platform functions as the virtual mirror so the second platform can calculate the time offset. In another example, if different wavelengths of light are used, both platforms can function as virtual mirrors so that the platforms can calculate the time offsets in parallel.

Figure 5:
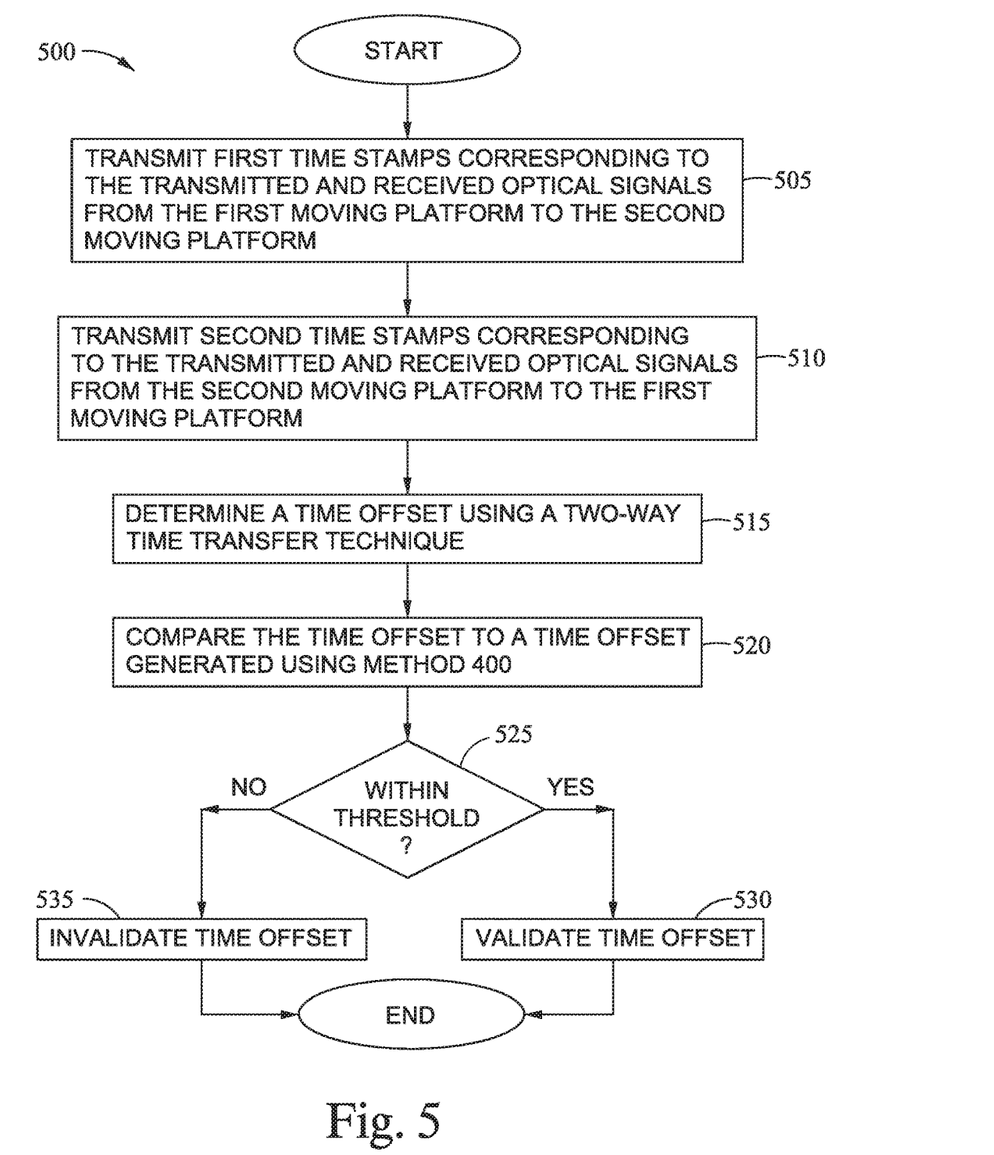
FIG. 5 is a flowchart for comparing time offsets generating using a virtual mirror and a two-way time transfer technique.

FIG. 5 is a flowchart of a method 500 for comparing time offsets generating using a virtual mirror and a two-way time transfer technique. For example, calculating the time offsets between the clocks in two moving platforms using two different techniques may provide more accurate time offsets as well as detect invalid data. At block 505, the first platform transmits first timestamps corresponding to the transmitted and received optical signals from the first moving platform to the second moving platform. In one aspect, the first platform stores a timestamp when each of the optical pulses is emitted from its interface at time $t_{d1}$ and records a timestamp each time an optical pulse is received from the second platform at time $t_{r2}$. The first platform can use optical or RF communication means to transmit these timestamps to the second platform.

At block 510, the second platform transmits second timestamps corresponding to the transmitted and received optical signals to the first platform when functioning as a virtual mirror. That is, the second platform stores a timestamp when each of the optical pulses is received at its interface at time $t_{r1}$ and records a timestamp each time an optical pulse is transmitted from the virtual mirror to the first platform at time $t_{d2}$. The first platform can use optical or RF communication means to transmit these timestamps to the second platform.

At block 515, the first and second platforms can use the shared timestamps to determine a time offset using a TWTT technique. One example of calculating the time offset ($t_{om}$) using the shared timestamps is shown in Equation 5:

$$t_{om} = \frac{t_{r2} + t_{d1}}{2} - \frac{t_{r1} + t_{d2}}{2} \quad (6)$$

In Equation 5, the time $t_{r2}$ is the time when the optical pulses are received at the first platform, the time $t_{d1}$ is the time when the optical pulses are transmitted by the first platform, the time $t_{r1}$ is the time the optical pulses are received at the second platform, and the time $t_{d2}$ is the time the optical pulses are transmitted by the second platform. Because both of the platforms have these shared timestamp values, the first and second platforms can calculate the time offset $t_{om}$.

At block 520, one or both of the platforms compares the time offset determined at block 515 to a time offset generated using the method 400. The time offset determined using a TWTT technique may be more accurate over a longer period of time than the time offset determined using the method 400 since the method 400 has an integral action (since it considers past time offset values) which may introduce an error over time. However, the time offset (and frequency offset and distance between the moving platforms based on the round trip time of travel of transmitting the first and second pluralities of optical pulses between the moving platforms) determined using the method 400 may produce an instantaneous distance measurement and time sampling synchronicity (clock pulses occurring at the same time regardless of total time offset) that is more accurate in the short term than the time offset calculated using a TWTT technique.

At block 525, the platforms determine if the difference between the time offsets is within a threshold. If so, at block 530, the platforms validate the time offsets as accurate. However, if not, at block 535, the platforms invalidate the time offsets (e.g. invalidate the data). That is, calculating the time offset using two different techniques provides redundancy which can be used to validate the offsets.

In one aspect, the platforms may average the time offset values determined using the two different techniques. For example, if the time offsets are deemed valid, the platform may choose to use the average of the two time offsets (or use TWTT to discipline or steer the virtual mirror calculation similar to how GPS can discipline clocks) when sharing sensor data, location data, and other information which is dependent on accurate timestamps and relative positions. In another aspect, the platforms may choose which one of the time offset values to use depending on the length of time the platforms have been determining the time offset since using the method 400 is more accurate in the short term but using the TWTT technique may be more accurate in the long term.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

As will be appreciated by one skilled in the art, aspects of the present invention may be embodied as a system, method or computer program product. Accordingly, aspects of the present invention may take the form of an entirely hardware example, an entirely software example (including firmware, resident software, micro-code, etc.) or an example combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to aspects of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects of the present invention, other and further aspects of the invention may be devised without departing from the basic scope thereof, and the scope thereof is determined by the claims that follow.

What is claimed is:

1. A method comprising:
   receiving a first optical signal transmitted by a first moving platform, the first optical signal comprising a first plurality of pulses;
   adjusting a command signal at a second moving platform such that the received first plurality of pulses overlap a second plurality of pulses generated at the second moving platform;
   transmitting a second optical signal comprising the second plurality of pulses from the second moving platform to the first moving platform, wherein each of the second plurality of pulses is transmitted from the second moving platform at the same time each of the first plurality of pulses is received at the second moving platform; and
   determining a first time offset between a first clock in the first moving platform and a second clock in the second moving platform based on the second plurality of pulses received at the first moving platform.

2. The method of claim 1, wherein determining the first time offset comprises:
   determining a Doppler shift between the first and second moving platforms based on a first frequency at which the first plurality of pulses are transmitted from the first moving platform and a second frequency at which the second plurality of pulses are received at the first moving platform.

3. The method of claim 2, wherein determining the first time offset comprises:
   receiving, at the first moving platform, a value of the command signal used to overlap the first plurality of pulses and the second plurality of pulses at the second moving platform; and
   determining a frequency offset between the first and second clocks based on the Doppler shift and the value of the command signal.

4. The method of claim 3, wherein determining the first time offset comprises:
   determining the first time offset based on a previously measured time offset and the frequency offset, wherein the first time offset is an average time offset.

5. The method of claim 1, wherein adjusting the command signal comprises:
   operating a pulse repetition frequency (PRF) regulator using the command signal until the second plurality of pulses overlap the first plurality of pulses.

6. The method of claim 1, operating a PRF regulator comprises:
   locking the second plurality of pulses to the first plurality of pulses using heterodyning in one of an optical domain and an electrical domain.

7. The method of claim 1, further comprising:
   sharing timestamps corresponding to times when the first and second pluralities of pulses are received and transmitted between the first and second moving platforms;

determining a second time offset based on a two-way time transfer (TWTT) technique;

comparing the second time offset to the first time offset; and determining a distance between the first and second moving platforms based on a time of travel of the first and second pluralities of pulses.

8. The method of claim 1, wherein the second moving platform comprises circuitry of a virtual mirror for adjusting the command signal such that the received first plurality of pulses overlap the second plurality of pulses.

9. A first platform, comprising:

an optical receiver configured to receive a first optical signal transmitted by a second platform through free space, the first optical signal comprising a first plurality of pulses; and circuitry forming a virtual mirror, the circuitry comprising:

a PRF regulator configured to adjust a command signal such that the received first plurality of pulses overlap a second plurality of pulses, and a pulsed laser source configured to transmit a second optical signal comprising the second plurality of pulses to the second platform, wherein each of the second plurality of pulses is transmitted from the first platform at the same time each of the first plurality of pulses is received at the first platform.

10. The platform of claim 9, wherein the PRF regulator is configured to lock the second plurality of pulses to the first plurality of pulses using heterodyning in one of an optical domain and an electrical domain.

11. The platform of claim 9, wherein the pulsed laser source comprises a femtosecond laser.

12. The platform of claim 9, wherein the pulsed laser source comprises a continuous wave laser and an optical modulator.

13. The platform of claim 9, wherein circuitry forming the virtual mirror is configured to record timestamps corresponding to when the first plurality of pulses are received at the platform, wherein the timestamps are transmitted to the second platform.

14. A method comprising:

transmitting a first plurality of optical pulses from a first moving platform to a second platform, wherein the second platform is configured as a virtual mirror to transmit a second plurality of pulses to the first moving platform, wherein each of the second plurality of pulses is transmitted from the second platform at the same time each of the first plurality of optical pulses is received at the second platform; and determining a first time offset between a first clock in the first moving platform and a second clock in the second platform based on the second plurality of pulses received at the first moving platform.

15. The method of claim 14, wherein determining the first time offset comprises:

determining a Doppler shift between the first and second platforms based on a first frequency at which the first plurality of optical pulses are transmitted from the first moving platform and a second frequency at which the second plurality of pulses are received at the first moving platform.

16. The method of claim 15, wherein determining the first time offset comprises:

receiving, at the first moving platform, a value of a command signal used to overlap the first plurality of optical pulses and the second plurality of pulses at the second platform; and determining a frequency offset between the first and second clocks based on the Doppler shift and the value of the command signal.

17. The method of claim 16, wherein determining the first time offset comprises:

determining the first time offset based on a previously measured time offset and the frequency offset, wherein the first time offset is an average time offset.

18. The method of claim 14, further comprising:

sharing timestamps corresponding to times when the first and second pluralities of pulses are received and transmitted between the first and second platforms;

determining a second time offset based on a two-way time transfer (TWTT) technique; and comparing the second time offset to the first time offset.

19. The method of claim 14, wherein the first moving platform is a first airplane.

20. The method of claim 19, wherein the second platform is a second airplane.

* * * * *